(12) United States Patent
Hoover et al.

(10) Patent No.: US 10,095,929 B1
(45) Date of Patent: Oct. 9, 2018

(54) SYSTEMS AND METHODS FOR AUGMENTED REALITY VIEW

(71) Applicant: Capital One Services, LLC, McLean, VA (US)

(72) Inventors: Jason Richard Hoover, Grapevine, TX (US); Micah Price, Plano, TX (US); Sunil Subrahmanyam Vasisht, Flowermound, TX (US); Qiaochu Tang, The Colony, TX (US); Geoffrey Dagley, McKinney, TX (US); Stephen Michael Wylie, Carrollton, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/913,976

(22) Filed: Mar. 7, 2018

(51) Int. Cl.
| | |
|---|---|
| *G06K 9/00* | (2006.01) |
| *G02B 27/01* | (2006.01) |
| *G06Q 30/06* | (2012.01) |
| *H04L 29/08* | (2006.01) |
| *G06T 19/00* | (2011.01) |

(52) U.S. Cl.
CPC ....... *G06K 9/00671* (2013.01); *G02B 27/017* (2013.01); *G06Q 30/0643* (2013.01); *G06T 19/006* (2013.01); *H04L 67/18* (2013.01)

(58) Field of Classification Search
CPC ... G06K 9/00671; G06T 19/006; H04L 67/18; G02B 27/017; G06Q 30/0643
See application file for complete search history.

(56) References Cited

U.S. PATENT DOCUMENTS

| | | | | |
|---|---|---|---|---|
| 2012/0327119 | A1* | 12/2012 | Woo | G06F 17/30029 345/633 |
| 2014/0096220 | A1* | 4/2014 | Da Cruz Pinto | G06F 21/00 726/9 |
| 2015/0084936 | A1* | 3/2015 | Bae | G06F 3/04815 345/179 |
| 2015/0123973 | A1* | 5/2015 | Larsen | G06T 15/04 345/427 |
| 2016/0086384 | A1* | 3/2016 | Stroila | G06T 11/60 345/633 |
| 2017/0039613 | A1* | 2/2017 | Kaehler | G02B 27/0172 |
| 2017/0116667 | A1* | 4/2017 | High | G06Q 30/0633 |

* cited by examiner

*Primary Examiner* — Maurice L. McDowell, Jr.
(74) *Attorney, Agent, or Firm* — Finnegan, Henderson, Farabow, Garrett & Dunner LLP

(57) ABSTRACT

Systems and methods for presenting an augmented reality view are disclosed. Embodiments include a system with a database for personalizing an augmented reality view of a physical environment using at least one of a location of a physical environment or a location of a user. The system may further include a hardware device in communication with the database, the hardware device including a renderer configured to render the augmented reality view for display and a controller configured to determine a scope of the augmented reality view authenticating the augmented reality view. The hardware device may include a processor configured to receive the augmented reality view of the physical environment, and present, via a display, augmented reality content to the user while the user is present in the physical environment, based on the determined scope of the augmented reality view.

18 Claims, 6 Drawing Sheets

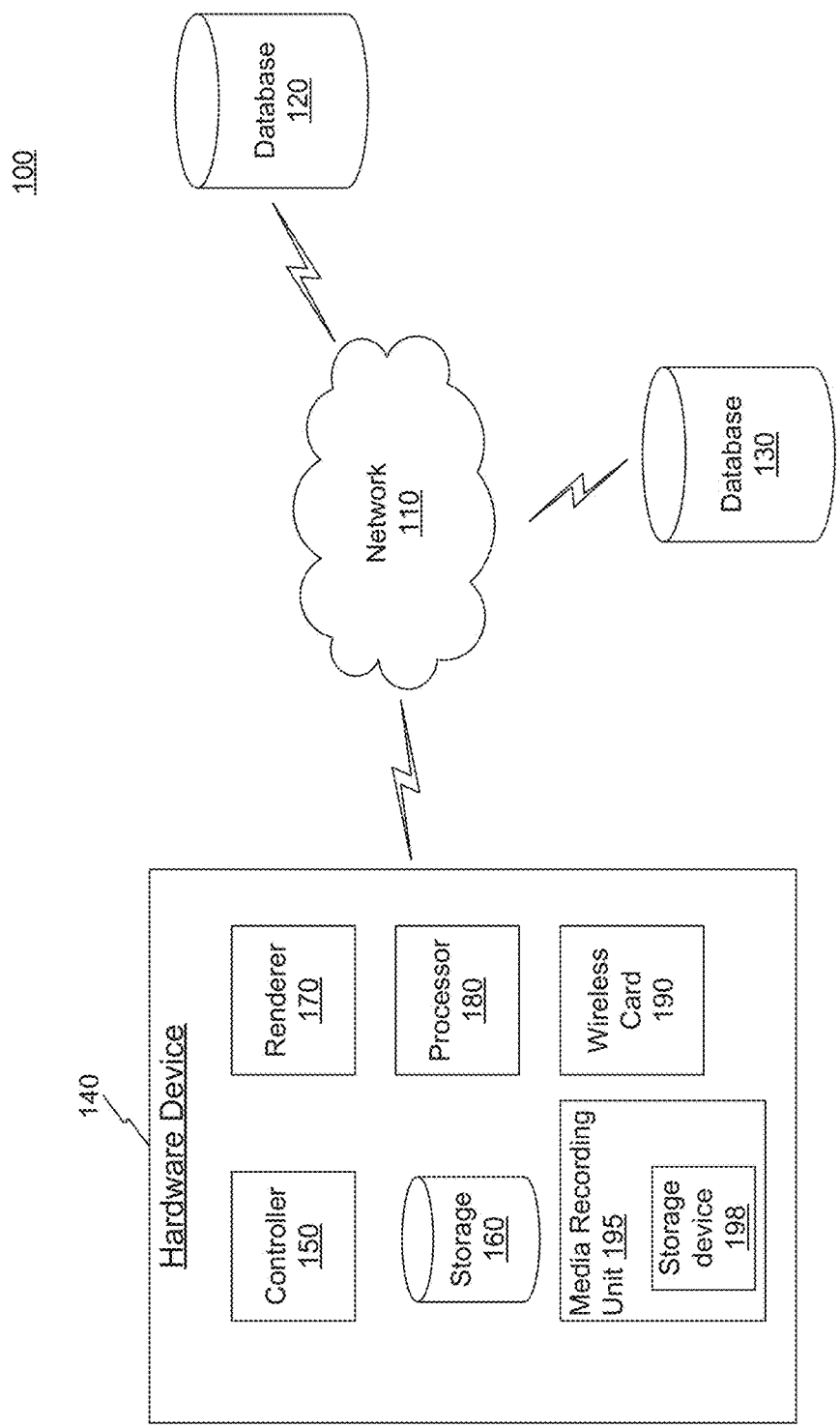

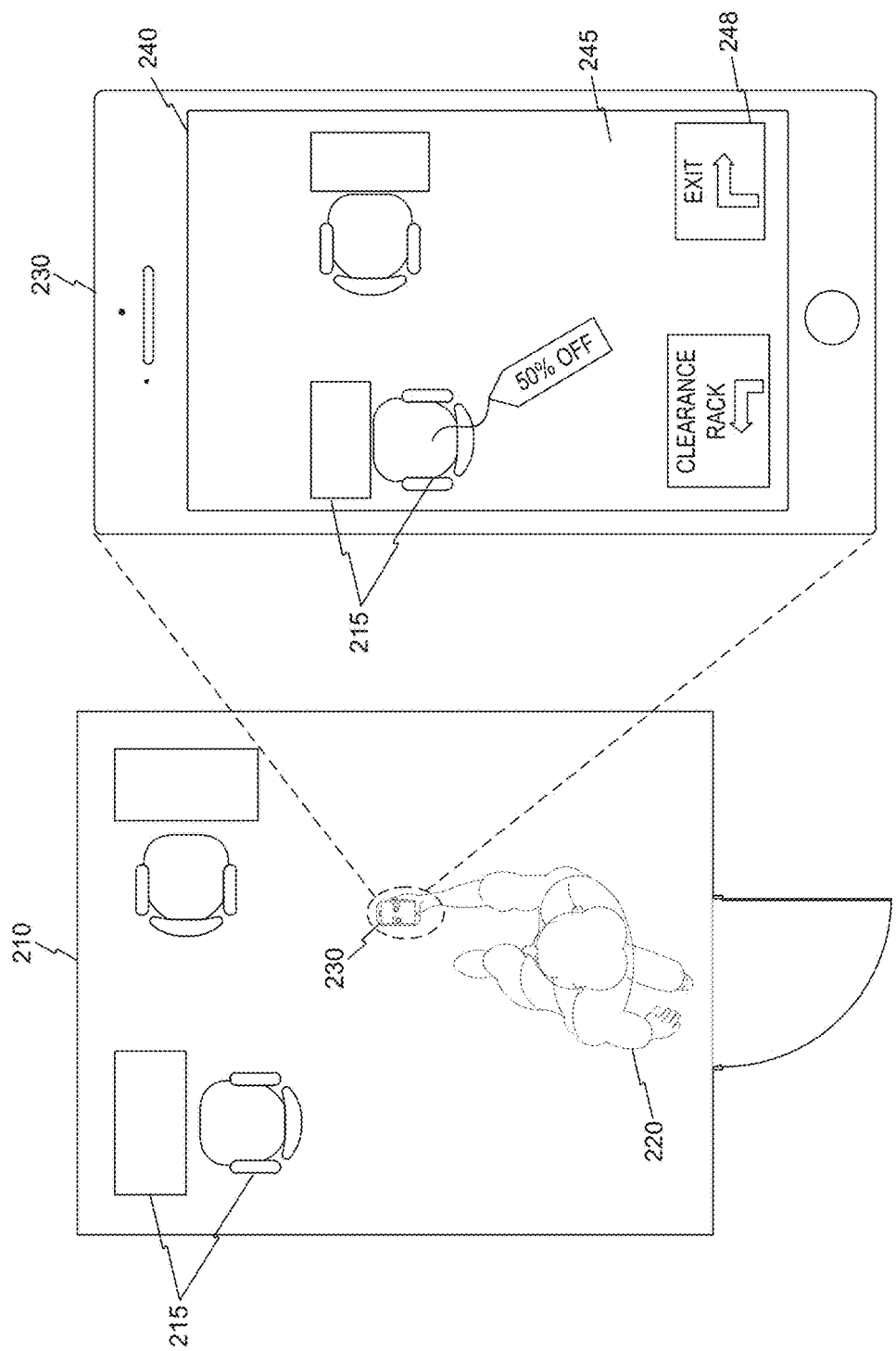

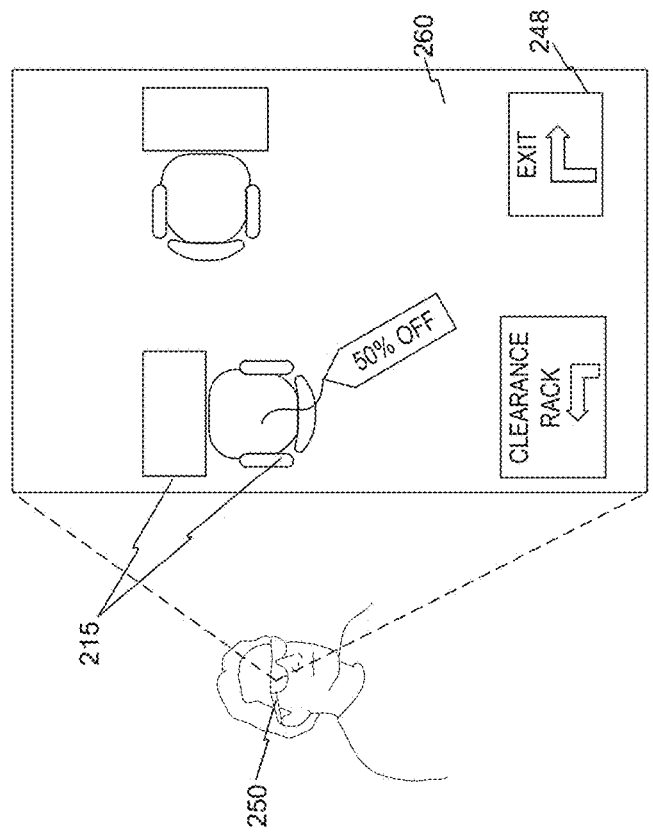
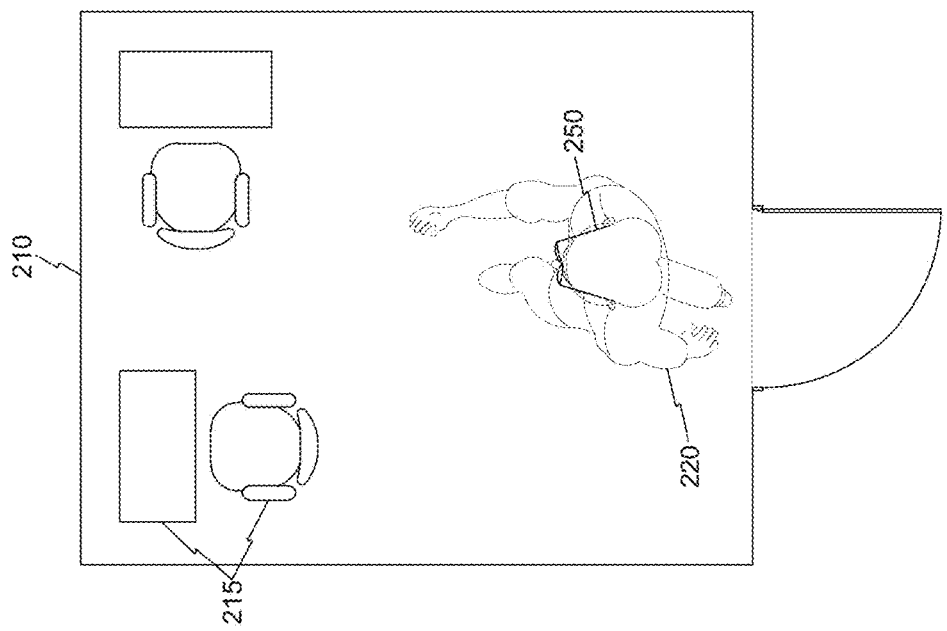

SYSTEMS AND METHODS FOR AUGMENTED REALITY VIEW

TECHNICAL FIELD

The present disclosure relates generally to a system for presenting an augmented reality view to a user, and more particularly, to a system and method for presenting an augmented reality view by rendering the augmented reality view based on a determined scope of objects in a physical environment to personalize and enhance a user's experience.

BACKGROUND

Augmented reality is used to enhance natural environments or situations and offer perceptually enriched experiences. With the help of advanced augmented reality technologies, for example, adding computer vision and object recognition, the information about the surrounding real world of the user becomes interactive. Information about the environment and its objects is typically overlaid on the real world information. This information can be virtual or real. Augmented reality also has a lot of potential in gathering and sharing tacit knowledge. Augmentation techniques are typically performed in real time and in semantic context with environmental elements. Immersive perceptual information is sometimes combined with supplemental information like scores over a live video feed of a sporting event. This combines the benefits of augmented reality technology and heads up display technology (HUD).

Augmented reality technology allows virtual imagery to be mixed with a real world physical environment. In other words, computer generated information may be superimposed on the user's field of view of the real world physical environment to allow the user to make better decisions and to provide an enhanced experience. For example, the augmented reality view may include information related to physical environment, simulations of weather conditions, simulations of traffic flows, upcoming meetings and scheduled appointments, etc. presented to the user, via a display. But, the augmented view may not be personalized for each user profile.

Virtual reality tools have been developed to provide concept visualizations. For example, the advent of sophisticated virtual reality software and other related tools has enabled a more engaging and involved experience for users. Virtual reality tools for video games and gaming experience enhancements have been extensively researched in the recent past. Virtual reality experience typically involves placing the user in an audio-visual simulation of real-world like environment, but most lack the ability to provide interactive and personalized views to a user.

In addition, currently, all businesses are limited by the amount of available physical space. A common approach to this problem is renting or buying real-estate such as a warehouse for temporary storage. Renting or buying additional space is not only expensive, but inefficient and inconvenient as well.

While it is known to use virtual reality software tools and augmented reality tools to enrich user experience, there is a need for a system that provides an enhanced and personalized experience by allowing the user easy access to information and enabling the service provider with tools to enrich their customers' experience. In addition, there is a need for a customizable experience for every user, based on their preferences and profiles.

The disclosed system and methods for presenting augmented reality content to a user, address one or more of the problems set forth above and/or other deficiencies in the prior art.

SUMMARY

One aspect of the present disclosure is directed to a system for presenting an augmented reality view. The system may include a database for personalizing an augmented reality view of a physical environment, the database comprising at least one of a location of a physical environment or a location of a user. The system may further include a hardware device in communication with the database, the hardware device including a renderer configured to render the augmented reality view for display and a controller configured to determine a scope of the augmented reality view based on authenticating the augmented reality view. The hardware device may include a processor configured to receive the augmented reality view of the physical environment, the augmented reality view representing one or more objects in the physical environment, personalize the augmented reality view of the physical environment based on the information in the database; and present, via a display, a personalized augmented reality view to the user while the user is present in the physical environment, based on the determined scope of the augmented reality view.

Another aspect of the present disclosure is directed to a method for presenting an augmented reality view, the method including receiving, via a processor, the augmented reality view of a physical environment, the augmented reality view representing one or more objects in the physical environment; determining, via a controller, a scope of the augmented reality view based on authenticating the augmented reality view; personalizing the augmented reality view of the physical environment using at least one of a location of the physical environment or a location of a user; rendering, via a renderer, the augmented reality view for display; and presenting, via a display, the augmented reality view to the user while the user is present in the physical environment, based on the determined scope of the augmented reality view.

Yet another aspect of the present disclosure is directed to a system for presenting an augmented reality view. The system may include a database for personalizing an augmented reality view of a physical environment, the database comprising at least one of a location of a physical environment or a location of a user; a renderer configured to render the augmented reality view for display; a controller configured to determine a scope of the augmented reality view based on identification verification of the user; and a processor configured to: receive the augmented reality view of the physical environment, the augmented reality view representing one or more objects in the physical environment, personalize the augmented reality view of the physical environment based on the information in the database, and present, via a display, augmented reality content to the user while the user is present in the physical environment, based on the determined scope of the augmented reality view.

In some embodiments, the processor may be further configured to execute at least one computer program configured to determine further personalization of the augmented reality view. In yet another embodiment, the processor may be further configured to determine one or more portions of the augmented reality view that are not authenticated, and present the augmented reality content without the determined one or more portions.

In some embodiments, the hardware device may further comprise a storage medium configured to store the augmented reality view of the physical environment. The hardware device may further comprise a media recording unit configured to capture at least one of images or videos of the augmented reality view of the physical environment. In some embodiments, the augmented reality content presented to the user is determined based on at least one of the location or orientation of the hardware device.

In some embodiments, the database may be configured for updating based on an updated layout of the physical environment. The layout of the physical environment may comprise data describing one or more objects in relation to at least one other object.

In some embodiments, the renderer is configured to add markers for customizing the augmented reality view based on at least one of the location of the user or a user preference. Consistent with some embodiments, rendering the augmented reality view may comprise rendering one or more of a static rendition, a dynamic rendition, or a contextual rendition.

In some embodiments, the augmented reality view may be based on authenticating the view. Consistent with some embodiments, authenticating the view may comprise identification verification of the user.

In some embodiments, the augmented reality view may represent at least one boundary larger than at least one boundary of the associated physical environment. The larger boundary may be rendered by vectoring at least one boundary.

It is to be understood that both the foregoing summary and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention. In the drawings:

FIG. 1 shows a block diagram of an exemplary system, in accordance with disclosed embodiments.

FIGS. 2A-B illustrate an exemplary system for presenting an augmented reality view to a user, in accordance with disclosed embodiments.

FIGS. 2C-D illustrate an exemplary system for presenting an augmented reality view to a user, in accordance with disclosed embodiments.

DETAILED DESCRIPTION

Figure 3:
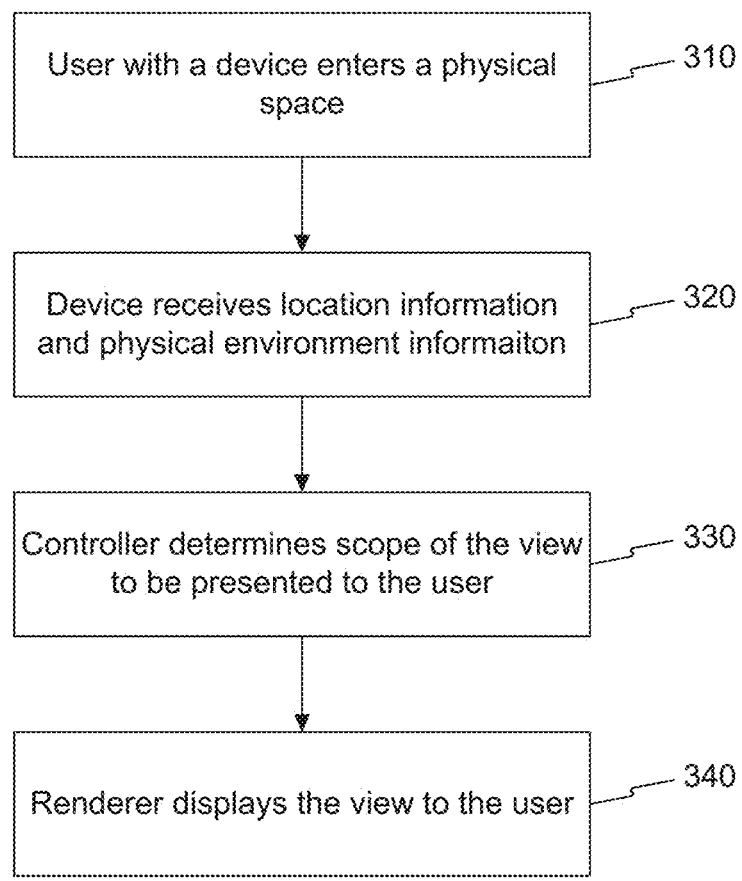
FIG. 3 is a flow chart illustrating an exemplary method of presenting an augmented reality view to the user, in accordance with disclosed embodiments.

The present disclosure is generally directed to systems and methods for presenting an augmented reality view allowing an enhanced shopping experience for the user. The system includes a database for personalizing an augmented reality view of a physical environment using at least one of a location of a physical environment or a location of a user. In some embodiments, the database may be configured for updating based on an updated layout of the physical environment. The system may further include a hardware device in communication with the database, the hardware device including a renderer configured to render the augmented reality view for display and a controller configured to determine a scope of the augmented reality view by exchanging one or more tokens between the hardware device and the database. In some embodiments, the hardware device may further comprise a storage medium and a media recording unit configured to capture at least one of images or videos of the augmented reality view of the physical environment. The hardware device may include a processor configured to receive and present augmented reality content to the user while the user is present in the physical environment, based on the determined scope of the augmented reality view. In some embodiments, the processor may be further configured to execute at least one computer program configured to determine further personalization of the augmented reality view. In yet another embodiment, the processor may be configured to determine one or more portions of the augmented reality view that are not authenticated, and present the augmented reality content without the determined one or more portions.

Some aspects of the present disclosure may be incorporated in fields involving client-provider relationships, or more broadly, involving two or more parties requiring interaction. In some aspects, a user may be presented an augmented reality view of a trail while trekking or participating in other outdoor activities. It could be advantageous to see the contours, pathways, angles, and other route challenges beforehand to better prepare oneself. In other fields, such as retail shopping, a user may be presented with an augmented reality view of store layouts, store contents, personalized shopping offers, inventories etc. to provide an enhanced interactive experience to the user. Some aspects of the disclosure may also be useful for a retailer or a business owner for better inventory control and stocking by accessing an augmented reality view of the warehouse. Some aspects of the present disclosure may be useful in the field of law enforcement and security. The law enforcement officers may benefit from an augmented reality view of a building or a structure in case of a hostile situation, allowing them to better prepare, plan and implement safe rescue operations.

Reference will now be made in detail to the disclosed embodiments, examples of which are illustrated in the accompanying drawings.

FIG. 1 is a block diagram of an exemplary system 100 for presenting an augmented view to the user, in accordance with disclosed embodiments. System 100 may include databases 120 and 130, and a hardware device 140. In some embodiments, as shown in FIG. 1, each component of system 100 may be connected to a network 110. However, in some embodiments, components of system 100 may be directly connected with each other.

In some embodiments, as shown in FIG. 1, database 120 and database 130 may be separate entities from each other, separately connected to network 110. In some embodiments, database 130 may be integrated into database 120 such that database 120 is connected directly to network 110 and database 130 is indirectly connected to network 110. Alternatively, database 120 and database 130 may be interchangeable.

In some embodiments, database 120 may be configured to be a primary database and database 130 as a back-up database. In other embodiments, database 130 may be configured to be a primary database and database 120 as a back-up database. A back-up database may be configured to perform similar operations as a primary database or some additional supporting functions in accordance with disclosed embodiments.

In some embodiments, database 120 may include one or more computing devices configured with appropriate software to perform operations consistent with personalizing an augmented reality view (such as augmented reality view 245 in FIG. 2B) of a physical environment within a physical space (such as physical space 210 in FIG. 2A), using the location information of that physical space. Database 120 may be configured to contain information about the physical layout of a physical space. The location information of a physical space may include, for example, geographic information and/or physical location information of a physical space.

In some embodiments, database 120 may include one or more computing devices configured with appropriate software to perform operations consistent with personalizing an augmented reality view of a physical environment using the location information of a user (e.g., user 220 in FIG. 2A) within a physical space. The location of a user may include, for example, geographic information and/or physical location information of a user within a physical space.

In some embodiments, personalizing or customizing an augmented reality view for a user includes recognizing the user, authenticating the user, analyzing user profile, and presenting personalized shopping recommendations based on the user profile. In some embodiments, personalizing an augmented reality view may include providing marker(s) (e.g. marker 248 in FIG. 2B and FIG. 2D) to further customize the shopping experience for a user. Marker(s), as referred to herein, may include an instruction or an indication delivered to a user while present in the physical environment. In some embodiments, marker(s) may be audio-visual instructions, or a sensory indication, or a combination thereof, displayed in an augmented reality view to a user.

In some embodiments, marker(s) may be used by the retailer or business owner to interact with user 220 in a more personalized way. For example, a marker may list personalized discounts, personalized offers, messages, personalized instructions, or directions to guide a user to a particular space within the physical space to provide an enhanced and customized shopping experience.

In some embodiments, database 120 may be configured for updating based on updated layout of the physical environment within a physical space. Database 120 may be configured to be continuously updated based on the updated layout of the physical environment. Hardware device 140 may be configured to detect a change in the layout of the physical environment and communicate the change to database 120. In some embodiments, updating may be automatic or manual. Manually updating may be triggered by user input. Automatic updating may be configured to execute at pre-determined times of the day, within pre-determined intervals, pre-determined events, or combinations thereof. In some embodiments, updating database 120 may also be triggered automatically based on determining a trigger event, for example, when the inventory of the store is updated either by adding or removing more products or more variety of products.

Database 120 may include, for example, Oracle™ databases, Sybase™ databases, or other relational databases or non-relational databases, such as Hadoop™ sequence files, HBase™, or Cassandra™. Database 120 may include computing components (e.g., database management system, database server, etc.) configured to receive and process requests for data stored in memory devices of database 120 and to provide data from database 120. In some embodiments, database 120 may take the form of a server, a general purpose computer, a mainframe computer, or any combination of these components. Other implementations consistent with disclosed embodiments are possible as well.

While database 120 and back-up database 130 are shown separately in FIG. 1, in some embodiments, database 120 and back-up database 130 may be included in or otherwise related to hardware device 140.

Hardware device 140 of system 100 may include, among other things, a controller 150, a storage unit 160, a renderer 170, a processor 180, a wireless card 190, and a media recording unit 195. Hardware device 140 may also include other suitable components not illustrated in FIG. 1, consistent with its ability to communicate with database 120 and/or connect to network 110. Additionally, those skilled in the art will recognize that the illustrations of hardware device 140 are simplified to highlight aspects of the present invention and that hardware devices typically include a variety of components not shown in FIG. 1.

In some embodiments, hardware device 140 may be, for example, a smartphone, tablet computer, smart eyewear, hand-held display, body-mounted display, shopping cart, head-mounted display, heads-up display, see through head mounted display, helmet-mounted display, or the like. Other suitable hardware devices may be used. A user may walk around a physical environment with hardware device 140 to obtain a real-time augmented reality view displayed on a display. Alternatively, the user may record the augmented reality view for later use.

Controller 150 may be a computing device configured to determine a scope of an augmented reality view presented to a user. Determining a scope of an augmented reality view may include, but not limited to, determining whether a product or merchandise should be presented in the augmented reality view to a user. For instance, controller 150 may be configured to determine whether a product or its details such as pricing, availability, images, etc. should be displayed or not based on the legal age of a user.

In some embodiments, determining the scope of an augmented reality view may include displaying products with a cautionary message. For instance, controller 150 may be configured to determine if a warning message should be displayed in an augmented reality view, such as when a user is looking at a pack of cigarettes.

Controller 150 may further be configured to determine the scope of an augmented reality view presented to a user based on authenticating the augmented reality view. In some embodiments, controller 150 may be configured to determine the content of augmented reality view based on authentication. The content of augmented reality view, hereafter referred to as the augmented reality content may include, for example, pricing information, product information, discount information, based on user profiles and preferences.

Authenticating an augmented reality view of a user may include identification verification of the user. In some embodiments, authenticating an augmented reality view may include exchanging tokens between hardware device 140 and database 120. Security exchange tokens, such as software tokens, may be used as a means to uniquely identify user to create a personalized augmented reality view. A software token may be a two-factor authentication security device that may be used to confirm identification of the user.

In some embodiments, authenticating an augmented reality view may be performed by using other well-known identification and verification techniques, for example, face recognition, audio-recognition, retinal scans, iris recognition, biometrics, finger-printing, security pin exchange, single-factor identification. Other suitable authentication techniques may be used.

Hardware device 140 may be equipped with additional components, for example, a camera, a position sensor detection (PSD) device, a motion sensor detection (MSD) device, an infra-red camera, a finger-print recognition device, an accelerometer, a global positioning system (GPS) device, a solid state compass, etc., to facilitate authenticating an augmented reality view to a user. Hardware device 140 may include other suitable components.

As shown in FIG. 1, hardware device 140 may include storage unit 160. Storage unit 160 may be configured to store information related to an augmented reality view of the physical environment, and the physical environment of a physical space. For example, storage unit 160 may be configured to store stills, images, and videos of an augmented reality view for a user to access later. In some embodiments, storage unit 160 may store data related to products displayed in an augmented reality view or related products.

In some embodiments, for example, storage unit 160 may be configured to store information related to a user. The user information may include user profile data, geographic and physical location of the user while shopping, historical data, user shopping preferences, etc. Access to storage unit 160 may require authentication of a user to protect data and user privacy. The user may be prompted to store related information as shared or private, for later use. Information stored as "shared" may be accessed later by the user, or by the user's friends and/or family members to provide their input. Depending on the characteristic of the information selected by a user, the information may require authentication for granting access. In some embodiments, storage unit 160 may be further configured to store information related to a virtual shopping cart or a list of items that user may potentially be interested in buying. A user may access the stored information locally or remotely. In some embodiments, storage unit 160 may be further configured to store instructions used by processor 180, to perform functions related to disclosed embodiments. For example, storage unit 160 may be configured with one or more software instructions that may perform one or more operations when executed by processor 180.

In some embodiments, the information stored in storage unit 160 may be formatted in the form of a list, a chart, a table, a drawing, or combinations thereof. The information may also be stored in coordinate space to store each object's location information relative to at least one other object as displayed in the physical environment of a physical space, at the time. The information stored in storage unit 160 may be accessed by a user later to revisit the shopping experience.

As shown in FIG. 1, hardware device 140 may include renderer 170. Renderer 170 may be configured to render an augmented reality view for display to a user. In some embodiments, renderer 170 may be a software program configured to receive information of the physical environment and/or information of the physical location of a user within a physical space. Renderer 170 may include an app on a smartphone, or a smartphone itself, head-mounted displays, heads-up display, smart eyewear, or a combination thereof. Other suitable renderers known to a person well-versed in the technology may be used.

Renderer 170 may be configured to communicate with processor 180. In some embodiments, renderer 170 may be configured to communicate with controller 150 configured to determine the scope of an augmented reality view. Renderer 170 may render augmentation based on the authentication of a user. For example, if the authentication of the user is unsuccessful, renderer 170 may render a selective display that excludes personalized offers. Alternatively, if the authentication is successful, renderer 170 may render advertising information offering special offers or deals on the product or alternative products, in the user's field of view. In some embodiments, renderer 170 may be configured to render augmentation information in an appropriate format using visual and/or audio presentation.

Rendering a personalized augmented reality view for a user may include rendering a static rendition, a dynamic rendition, or a contextual rendition, or any combination thereof. Static renditions may remain stationary in the personalized augmented reality view, for example, a message from the retailer highlighting "tax-free", or a cautionary message reading "Floor Wet, Use Caution". Dynamic renditions may change dynamically as a user walks around in a physical space. One or more dynamic renditions may be further configured to change periodically, repetitively, or a combination thereof. Contextual renditions may be configured to follow a user around while the user is shopping. For example, a contextual rendition of an augmented reality view may include directions for emergency exit, or directions to check-out aisles, etc. Other suitable renditions may be displayed.

Hardware device 140 may further comprise processor 180. Processor 180 may include one or more known processing devices, such as, but not limited to, microprocessors from the Pentium™ or Xeon™ family manufactured by Intel™, the Turion™ family manufactured by AMD™, or any of various processors from other manufacturers. In some embodiments, processor 180 may execute software instructions or hardware instructions to perform functions in accordance with the disclosure.

In some embodiments, processor 180 may be configured to receive an augmented reality view of a physical environment of physical space. The augmented reality view may represent one or more physical objects (such as physical objects 215 in FIG. 2A) in the physical environment. In some embodiments, processor 180 may be configured to employ object recognition technology to enable representing a physical object in a physical environment to an augmented reality view. Object recognition technology in the field of computer generated vision identifies objects in an image, multiple images, or a video sequence based on a number of factors, including, but not limited to, appearance, features, etc.

Processor 180 may further be configured to present an augmented reality view to a user while the user is present in the physical environment, based on the determined scope of the augmented reality view, via a display (such as display 240 in FIG. 2B). Processor 180 may communicate with other components of hardware device 140. In some embodiments, processor 180 may communicate with database 120 to perform functions in accordance with the disclosure. Communication between processor 180 and components of hardware device 140, and/or between processor 180 and database 120 may be configured to be executed through network 110.

Processor 180 may execute one or more computer programs configured to determine further personalization of an augmented reality view of a user. For example, processor 180 may receive authentication information from controller 150 and customize an augmented reality view to a user based on the authentication information received. The augmented reality view may include physical environment information based on the location of user overlaid with relevant product details displayed to the user.

Hardware device 140 may include wireless card 190. Wireless card 190 may be configured to facilitate wireless communication and exchange of data between hardware device 140 and database 120 through network 110. In some embodiments, wireless card 190 may be configured to facilitate wireless communication and exchange of data between hardware device 140 and database 120 without network 110. In yet other embodiments, wireless card 190 may be configured to facilitate wireless communication between each of the components of hardware device 140. Wireless card 190 may include one or more digital and/or analog communication device to communicate with and/or detect other components, such as a network controller and/or wireless adapter for communicating over the Internet or suitable Wi-fi communication pathways. Other implementations consistent with disclosed embodiments are possible as well.

As shown in FIG. 1, hardware device 140 may include a media recording unit 195. Media recording unit 195 may be configured to capture image(s) and/or video(s) of an augmented reality view presented to a user via a display, image(s) and/or video(s) of a user within a physical space, image(s) and/or video(s) of a physical environment alone. In some embodiments, media recording unit 195 may capture image(s) and/or video(s) of any of the combinations thereof. In some embodiments, media recording unit 195 may include a local storage device 198 configured to communicate with storage unit 160 of hardware device 140. In some embodiments, local storage device 198 of media recording unit 195 may be a stand-alone device.

In some embodiments, images and/or videos captured by media recording unit 195 may be accessed by other components of hardware device 140 associated with presenting an augmented reality view of the physical environment to a user. In some embodiments, images and/or videos captured by media recording unit 195 may be stored temporarily in storage device of media recording unit 195 and accessed later for presenting an augmented reality view of the physical environment to a user. Media recording unit 195 may include other components, such as, but not limited to, a camera, a sound-recording device, a voice recognition device, and relevant software for supporting executable instructions to perform functions in accordance with disclosed embodiments.

FIGS. 2A-B illustrate an exemplary system for presenting an augmented reality view 245 to user 220 with hand-held device 230 in physical space 210. Physical space 210 houses one or more physical objects 215. Hand-held device 230 may include display 240 displaying an augmented reality view 245 including one or more physical objects 215 and marker(s) 248. Marker 248 may be associated with and/or contain information related to one or more physical objects 215. Some marker(s) may be an instruction or an indication displayed in augmented reality view 245 for user 220.

Physical space 210 may include a business space, a retail store, a warehouse facility, a departmental store, a grocery store, a shopping mall, or the like. Physical objects 215 may include a variety of products, such as, but not limited to, furniture items, clothes, food items, consumables, sporting goods, medical devices, etc. Physical objects 215 may be displayed in physical space 210 in a specific layout. Database 120 may be configured to store information regarding layout of physical objects 215 in physical space 210. The layout information may include geographic location information and physical location information describing the position of one object 215 relative to at least one other object 215 in physical space 210.

As illustrated in FIG. 2A, when user 220 walks into a physical space 210, such as a store, hand-held device 230 may map the three-dimensional space including the physical environment of physical space 210 having one or more boundaries such as walls, floors, and ceilings. Images from one or multiple perspectives, including depth images from hand-held device 230 or depth cameras installed in physical space 210, may be combined by an image processing application based on a common coordinate system for space. In some embodiments, hardware device 140 may include a Graphics Processing Unit (GPU), not shown in FIG. 1, configured to execute instructions associated with the image processing application.

Physical objects 215 and/or boundaries of physical space 210 may be detected, for example, by edge detection techniques. Objects may be identified by pattern recognition techniques including facial recognition techniques with reference images of objects and boundaries stored in database 120. In some embodiments, augmented reality view 245 displayed on display 240 of hand-held device 230 may display extended one or more boundaries to allow user 220 to view more products and product data than physically displayed. Furthermore, augmented reality view 245 displayed on display 240 of hand-held device 230 including extended boundaries may be used by the retailer to display more products and product data.

In some embodiments, the physical environment may extend past current boundaries to display a larger virtual physical space in augmented reality view 245. In some embodiments, augmented reality view 245 may represent at least one boundary larger than one of the other boundaries of the associated physical environment to create a larger virtual space to display additional products and related information. Extending one or more boundaries associated with the physical environment may be accomplished by identifying one or more boundaries and drawing one or more vectors past the boundary to create a larger virtual space. Other suitable and well-known techniques may be employed as well.

Hand-held device 230 may be further configured to communicate data such as the location and the position of user 220, to database 120. Database 120 may receive and store information regarding the location and position of user 220 in real-time, enabling continuous updating of the information regarding user 220 location.

FIGS. 2C-D illustrate an exemplary system for presenting an augmented reality view 260 to user 220 in physical space 210, wearing smart eyewear 250. Physical space 210 houses one or more physical objects 215. Smart eyewear 250 may project an augmented reality view 260 including one or more physical objects 215. Augmented reality view 260 may be projected in user's field of view or on a surface such as a screen, wall, etc.

Augmented reality view 260 projected by smart eyewear 250 may allow the retailer more space to show greater depth and more variety of products. Augmented reality view 260 may also allow user 220 with smart eyewear 250 to view more products and product data than physically displayed. In some embodiments, augmented reality view 260 may include image of physical space 210 having one or more boundaries. One or more of the walls, ceilings, and floors may be identified as boundaries. In some embodiments, other physical objects such as, but not limited to, cabinet edges, temporary wall partitioning, doors may be identified as boundaries.

In some embodiments, the physical environment may extend past current boundaries to display a larger virtual physical space in augmented reality view 260. In some embodiments, augmented reality view 260 may represent at least one boundary larger than one of the other boundaries of the associated physical environment to create a larger virtual space to display additional products and related information. Extending one or more boundaries associated with the physical environment may be accomplished by identifying one or more boundaries and drawing one or more vectors past the boundary to create a larger virtual space. Other suitable and well-known techniques may be employed as well.

One aspect of the present disclosure is directed to a method of presenting an augmented reality view (e.g., 245 or 260) to a user. FIG. 3 is a flow chart illustrating an exemplary method of presenting an augmented reality view to a user, in accordance with disclosed embodiments. In some embodiments, the method for presenting augmented reality view may be executed by one or more components of system 100.

An exemplary method of presenting an augmented reality view 245 to user 220 may include user 220 with a hand-held device 230 walking into physical space 210, as shown in step 310. Physical space 210 may include a business space, a retail store, a warehouse facility, a departmental store, a grocery store, a shopping mall, a business outlet, or the like. In some embodiments physical space 210 may be a museum, a zoo, an aquarium, or the like. In some embodiments, user 220 may represent a single user or a group of users occupying physical space 210.

In step 320, hand-held device 230 may obtain and/or receive location information of user 220 within physical space 210. The location of user 220 may include, for example, geographic information and/or physical location of user 220 within physical space 210. The user location information may be stored as coordinates in physical space or longitudinal and latitudinal coordinate space. Hand-held device 230 may further be configured to obtain and/or receive information related to physical environment within physical space 210. Information related to physical environment may include location information of physical objects 215 in physical space 210. The location information of physical objects 215 may include, for example, geographic information and/or physical location of physical objects 215 within physical space 210. The physical objects 215 location information may be stored as coordinates in physical space or longitudinal and latitudinal coordinate space.

In some embodiments, physical environment information may include images and/or videos of physical objects 215 present in physical space 210. Hand-held device 230 may be configured to obtain the images and/or videos using an in-built media recording unit 195. Hand-held device 230 may further be configured to receive images and/or videos from an external media recording unit connected to hand-held device 230, with or without network 110. In some embodiments, the external media recording unit, such as, but not limited to, a camera may be physically connected to hand-held device 230 through a USB connection.

In step 330, controller 150 of hand-held device 230 may determine the scope of augmented reality view 245 to be presented to user 220. Controller 150 may be configured to determine the scope of augmented reality view 245 by identifying the relative location and/or orientation of user 220. In some embodiments, controller 150 may be configured to determine the scope of augmented reality view 245 by identifying the relative location and/or orientation of hand-held device 230.

Controller 150 may be configured to identify the relative location and/or orientation of user 220 by determining the physical environment information obtained by hand-held device 230. In some embodiments, physical environment information may include location information of physical objects 215, one or more boundaries of physical space 210, markers present in physical space 210, or combinations thereof. Other relevant physical environment information may be used as well.

In step 340, renderer 170 of hand-held device 230 may render augmented reality view 245 on display 240 to user 220. Renderer 170 may be configured to communicate with controller 150, processor 180, media recording unit 195, or other components of hand-held device 230. Renderer 170 may be further configured to render augmented reality view 245 in multiple formats including a static rendition, a dynamic rendition, or a contextual rendition, or combinations thereof.

In some embodiments, renderer 170 may render an interactive augmented reality view 245. User 220 may choose to directly interact with augmented reality view 245. For example, renderer 170 may render an augmented reality view of a virtual living room with furniture. User 220 may prefer to "move" around furniture placement within the virtual living room, or replace furniture items with other options available in the store before making a shopping decision. The interactive augmented reality view 245 provides user 220 with an enhanced shopping experience.

In some embodiments, renderer 170 renders an augmented reality view 245 to allow user 220 to interact with a third-party such as, an expert, or a consultant, or a business owner, or store manager, or a customer representative, or a salesman while shopping. User 220 may be allowed to share augmented reality view 245 displayed on display 240 of hand-held device 230 with the person user 220 is interacting with. In some embodiments, user 220 and the third-party may be allowed to communicate, including sharing text, images, audio, etc. Other interactions between user 220 and the third-party may be allowed as well.

Figure 4:
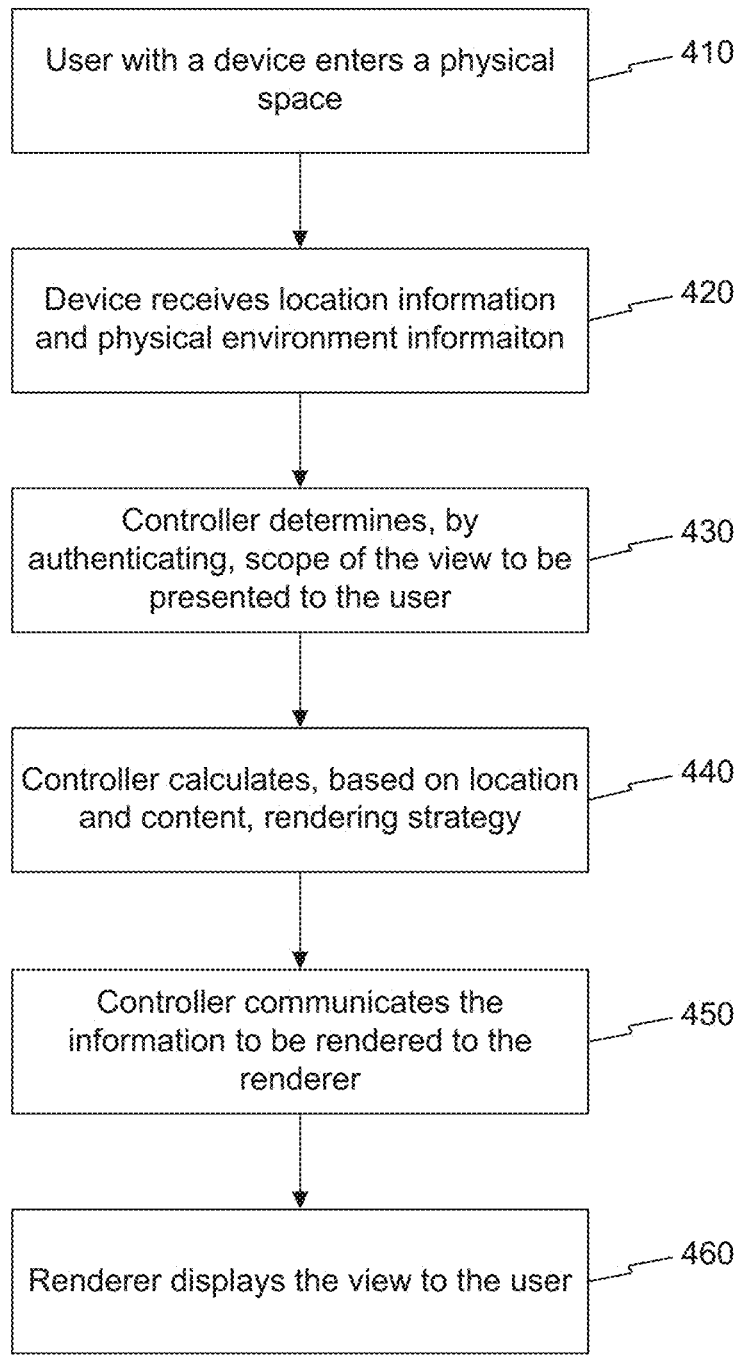
FIG. 4 is a flow chart illustrating an exemplary method of presenting an augmented reality view to the user, in accordance with disclosed embodiments.

Another aspect of the present disclosure is directed to a method of presenting an augmented reality view 245 to user 220. FIG. 4 is a flow chart illustrating an exemplary method of presenting an augmented reality view 245 to user 220, in accordance with disclosed embodiments. In some embodiments, the method for presenting augmented reality view may be executed by one or more components of system 100.

An exemplary method of presenting an augmented reality view 245 to user 220 may include user 220 with a hand-held device 230 walking into physical space 210, as shown in step 410. Physical space 210 may include a business space, a retail store, a warehouse facility, a departmental store, a grocery store, a shopping mall, or a business outlet. In some embodiments physical space may be a museum, a zoo, an aquarium, or similar display spaces for entertainment purposes. In some embodiments, user 220 may represent a single user or a group of users occupying physical space 210.

In step 420, hand-held device 230 may obtain and/or receive location information of user 220 within physical space 210. The location of user 220 may include, for example, geographic information and/or physical location of user 220 within physical space 210. The user location information may be stored as coordinates in physical space or longitudinal and latitudinal coordinate space. Hand-held device 230 may further be configured to obtain and/or receive information related to physical environment within physical space 210. Information related to physical environment may include location information of physical objects 215 in physical space 210. The location information of physical objects 215 may include, for example, geographic information and/or physical location of physical objects 215 within physical space 210. The physical objects 215 location information may be stored as coordinates in physical space or longitudinal and latitudinal coordinate space.

In some embodiments, physical environment information may include images and/or videos of physical objects 215 present in physical space 210. Hand-held device 230 may be configured to obtain the images and/or videos using an in-built media recording unit 195. Hand-held device 230 may further be configured to receive images and/or videos from an external media recording unit connected to hand-held device 230, with or without network 110. In some embodiments, the external media recording unit, such as, but not limited to, a camera may be physically connected to hand-held device 230 through a USB connection.

In step 430, controller 150 of hand-held device 230 may determine the scope of augmented reality view 245 to be presented to user 220. Controller 150 may be configured to determine the scope of augmented reality view 245 by authenticating augmented reality view 245 of user 220. Authenticating augmented reality view 245 of user 220 may include identification verification of user 220. In some embodiments, identification verification may include exchanging tokens between hand-held device 230 and database 120. Exchanged tokens may include security exchange tokens, such as software tokens, as a means to uniquely identify user 220 to create a personalized augmented reality view 245. A software token may be a two-factor authentication security device that may be used to confirm identification of the user. Other suitable identification verification techniques, such as, facial recognition, retinal scans, iris recognition, finger printing, biometrics, etc. may be used as well.

In some embodiments, controller 150 of hand-held device 230 may determine the content of augmented reality view 245 to be presented to user 220. For example, the scope and content of augmented reality view 245 may be customized based on authentication results, allowing a retailer to provide a personalized augmented reality view 245 to user 220 for an enhanced shopping experience. In some embodiments, once authenticated, user profile stored in database 120 may be updated based on user's 220 shopping experience, such as, date and time of the day, duration at the store, products viewed, products purchased, products considered, etc.

In some embodiments, each of the components of hand-held device 230 such as, controller 150, storage unit 160, renderer 170, processor 180, wireless card 190, and media recording unit 195 may be configured to require authentication to perform functions associated with presenting an augmented reality view 245 to user 220.

Upon authentication, controller 150 may determine the rendition format of physical objects 215 and/or physical environment within physical space 210 to user 220, based on the location of user 220 and/or the content to be displayed, in step 440. Determining the rendition may include, but not limited to, the format of rendition, layout of rendition, content of rendition, timing of rendition, etc. For example, controller 150 may determine a rendition format based on the location of user 220 or the orientation of user 200.

In some embodiments, controller 150 calculates the way in which physical objects 215 and/or physical environment within physical space 210 are rendered to user 220 based on the location of user 220 and/or the content to be displayed. Controller 150 may calculate the way in which objects and/or physical environment are rendered based on an algorithm, a mathematical expression, a self-learning computer program, etc. Other suitable methods may be used.

In step 450, controller 150 may communicate the information to be rendered to renderer 170 of hand-held device 230. In some embodiments, renderer 170 may include an external rendering device connected with hand-held device 230, through a wired or a wireless connection.

In step 460, renderer 170 may display augmented reality view 245 to user 220 on display 240 of hand-held device 230.

Figure 5:
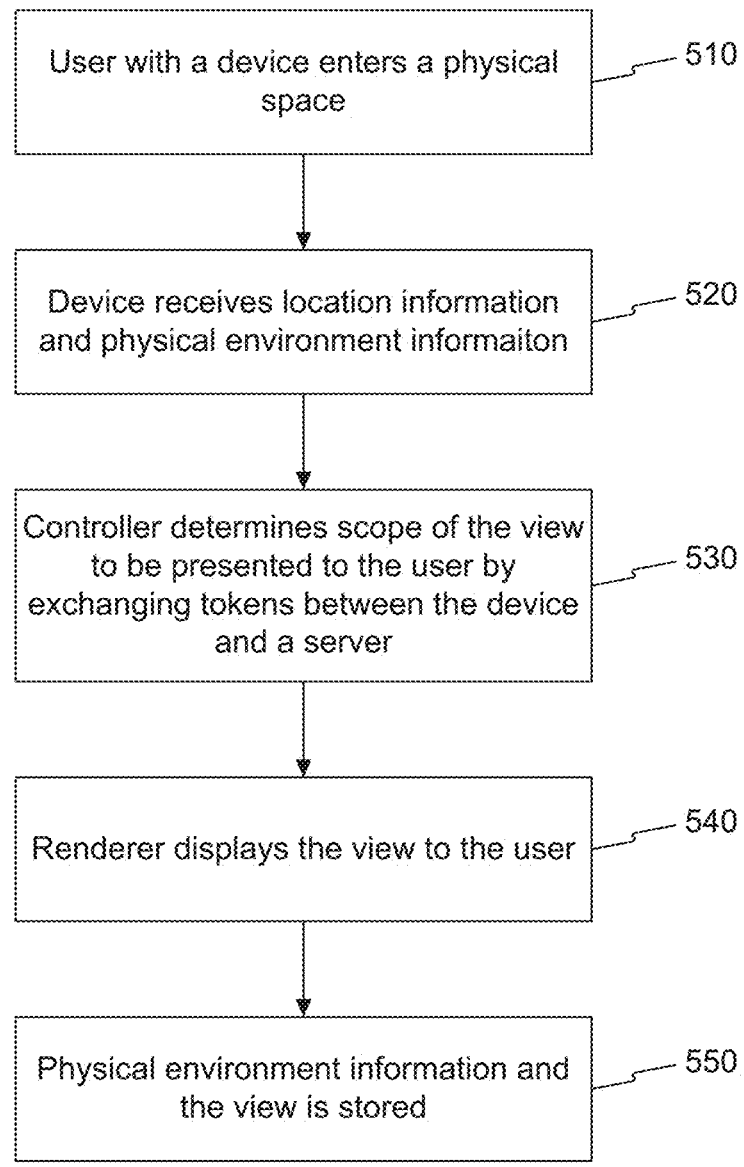
FIG. 5 is a flow chart illustrating an exemplary method of presenting an augmented reality view to the user, in accordance with disclosed embodiments.

Another aspect of the present disclosure is directed to a method of presenting an augmented reality view to a user. FIG. 5 is a flow chart illustrating an exemplary method of presenting an augmented reality view to a user, in accordance with disclosed embodiments. In some embodiments, the method for presenting augmented reality view may be executed by one or more components of system 100.

An exemplary method of presenting an augmented reality view 245 to user 220 may include user 220 with a hand-held device 230 walking into physical space 210, as shown in step 510.

In step 520, hand-held device 230 may obtain and/or receive location information of user 220 within physical space 210. The location of user 220 may include, for example, geographic information and/or physical location of user 220 within physical space 210. The user location information may be stored as coordinates in physical space or longitudinal and latitudinal coordinate space. Hand-held device 230 may further be configured to obtain and/or receive information related to physical environment within physical space 210. Information related to physical environment may include location information of physical objects 215 in physical space 210. The location information of physical objects 215 may include, for example, geographic information and/or physical location of physical objects 215 within physical space 210. The physical objects 215 location information may be stored as coordinates in physical space or longitudinal and latitudinal coordinate space.

In some embodiments, physical environment information may include images and/or videos of physical objects 215 present in physical space 210. Hand-held device 230 may be configured to obtain the images and/or videos using a media recording unit 195 that may be built in to hand-held device 230 or connected to hand-held device 230, with or without network 110. In some embodiments, the external media recording unit (e.g., a camera) may be physically connected to hand-held device 230 through a USB connection.

In step 530, controller 150 of hand-held device 230 may determine the scope of augmented reality view 245 to be presented to user 220. Controller 150 may be configured to determine the scope of augmented reality view 245 by authenticating augmented reality view 245 of user 220. Authenticating augmented reality view 245 of user 220 may include identification verification of user 220. In some embodiments, identification verification may include exchanging tokens between hand-held device 230 and database 120. Other suitable identification verification techniques, such as, facial recognition, retinal scans, iris recognition, finger printing, biometrics, etc. may be used as well.

In some embodiments, controller 150 of hand-held device 230 may determine the content of augmented reality view 245 to be presented to user 220. The scope and content of augmented reality view 245 may be customized based on authentication results, allowing retailer to provide a personalized augmented reality view 245 to user 220 for an enhanced shopping experience. In some embodiments, once authenticated, user profile stored in database 120 may be updated based on user's 220 shopping experience, such as, date and time of the day, duration at the store, products viewed, products purchased, products considered, etc.

In some embodiments, each of the components of hand-held device 230 such as, controller 150, storage unit 160, renderer 170, processor 180, wireless card 190, and media recording unit 195 may be configured to require authentication to perform functions associated with presenting an augmented reality view 245 to user 220.

Upon authentication, controller 150 may determine the rendition format of physical objects 215 and/or physical environment within physical space 210 to user 220, based on the location of user 220 and/or the content to be displayed. Determining the rendition may include, but not limited to, the format of rendition, layout of rendition, content of rendition, timing of rendition, etc. For example, controller 150 may determine a rendition format based on the location or the orientation user 220 is looking at.

In some embodiments, controller 150 calculates the way in which physical objects 215 and/or physical environment within physical space 210 are rendered to user 220 based on the location of user 220 and/or the content to be displayed. Controller 150 may calculate the way in which objects and/or physical environment are rendered based on an algorithm, a mathematical expression, a self-learning computer program, etc. Other suitable methods may be used. Controller 150 may communicate the information to be rendered to renderer 170 of hand-held device 230. In some embodiments, renderer 170 may include an external rendering device connected with hand-held device 230, through a wired or a wireless connection.

In step 540, renderer 170 may display augmented reality view 245 to user 220 on display 240 of hand-held device 230. In some embodiments, renderer 170 may display augmented reality view 260 using smart eyewear 250.

In step 550, physical environment of physical space 210 and augmented reality view 245 may be stored in a storage media for instant access or delayed access. Storage media may include, but not limited to, storage 160 of hand-held device 230, local storage device 198 of media recording unit 195, database 120, database 130, or an external storage medium including a cloud platform, server, computer hard drive etc. The stored information may be accessed remotely through an internet connection.

Although aspects of the present invention are described as presenting augmented reality views to user 220 discusses using hand-held device 230, one skilled in the art will appreciate that these aspects can also be presented using smart eyewear, head mounted displays, heads up displays, helmet mounted displays, smart glasses, or other suitable wearable devices. The scope of the invention is defined by the claims and their equivalents.

The foregoing descriptions have been presented for purposes of illustration and description. They are not exhaustive and do not limit the invention to the precise form disclosed. Modifications and variations are possible in light of the above teachings or may be acquired from practicing of the invention. For example, the described implementation includes software but the present invention may be implemented as a combination of hardware and software or in hardware alone.

Other embodiments of the invention will be apparent to those skilled in the art from consideration of the specification and practice of the invention disclosed herein. The specification and examples should be considered as exemplary only, with a true scope and spirit of the invention being indicated by the following claims.

What is claimed is:

1. A system for presenting an augmented reality view, comprising:
    a database server for personalizing an augmented reality view of a physical environment, the database server comprising at least one of a location of a physical environment or a location of a user;
    a hardware device in communication with the database server, the hardware device including:
    a hardware-implemented renderer configured to render the augmented reality view for display;
    a hardware-implemented controller configured to determine a scope of the augmented reality view based on authenticating the augmented reality view; and
    a processor configured to:
    receive the augmented reality view of the physical environment, the augmented reality view representing one or more objects in the physical environment,
    personalize the augmented reality view of the physical environment based on the information in the database server; and
    present, via a display, a personalized augmented reality view to the user while the user is present in the physical environment, based on the determined scope of the augmented reality view,
    wherein the augmented reality view represents at least one boundary larger than at least one boundary of the associated physical environment.

2. The system of claim 1, wherein the processor is further configured to execute at least one computer program configured to determine further personalization of the augmented reality view.

3. The system of claim 1, wherein the database server is configured for updating based on an updated layout of the physical environment.

4. The system of claim 3, wherein the layout of the physical environment comprises data describing one or more objects in relation to at least one other object.

5. The system of claim 1, wherein the hardware-implemented renderer is further configured to add markers for customizing the augmented reality view based on at least one of the location of the user or a user preference.

6. The system of claim 1, wherein authenticating the augmented reality view comprises identification verification of the user.

7. The system of claim 6, wherein identification verification comprises exchanging security tokens between the hardware device and the database server.

8. The system of claim 1, wherein the processor is further configured to:
    determine one or more portions of the augmented reality view that are not authenticated, and
    present the augmented reality content without the determined one or more portions.

9. The system of claim 1, wherein rendering the augmented reality view comprises rendering one or more of a static rendition, a dynamic rendition, or a contextual rendition.

10. The system of claim 1, wherein the larger boundary is rendered by vectoring the at least one boundary.

11. The system of claim 1, wherein the hardware device further comprises a storage medium configured to store information related to the augmented reality view of the physical environment.

12. The system of claim 1, wherein the hardware device further comprises a media recording unit configured to capture at least one of images or videos of the augmented reality view of the physical environment.

13. The system of claim 1, wherein the augmented reality content presented to the user is determined based on at least one of the location or orientation of the hardware device.

14. A method for presenting an augmented reality view, the method comprising:
   receiving, via a processor, the augmented reality view of a physical environment, the augmented reality view representing one or more objects in the physical environment;
   determining, via a hardware-implemented controller, a scope of the augmented reality view based on authenticating the augmented reality view;
   personalizing the augmented reality view of the physical environment using at least one of a location of the physical environment or a location of a user;
   rendering, via a hardware-implemented renderer, the augmented reality view for display; and
   presenting, via a display, the augmented reality view to the user while the user is present in the physical environment, based on the determined scope of the augmented reality view,
   wherein the augmented reality view represents at least one boundary larger than at least one boundary of the associated physical environment.

15. The method of claim 14, wherein authenticating the augmented reality view comprises verifying identification of the user.

16. The method of claim 14, further comprising:
   capturing at least one of images or videos of the augmented reality view of the physical environment; and
   storing information related to the augmented reality view of the physical environment.

17. The method of claim 14, further comprising:
   determining, via the processor one or more portions of the augmented reality view that are not authenticated, and
   presenting the augmented reality content without the determined one or more portions.

18. A system for presenting an augmented reality view, comprising:
   a database server for personalizing an augmented reality view of a physical environment, the database server comprising at least one of a location of a physical environment or a location of a user;
   a hardware-implemented renderer configured to render the augmented reality view for display;
   a hardware-implemented controller configured to determine a scope of the augmented reality view based on identification verification of the user; and
   a processor configured to:
   receive the augmented reality view of the physical environment, the augmented reality view representing one or more objects in the physical environment,
   personalize the augmented reality view of the physical environment based on the information stored in the database server, and
   present, via a display, augmented reality content to the user while the user is present in the physical environment, based on the determined scope of the augmented reality view,
   wherein the augmented reality view represents at least one boundary larger than at least one boundary of the associated physical environment.

\* \* \* \* \*